United States Patent
Sato et al.

(10) Patent No.: US 12,030,297 B2
(45) Date of Patent: Jul. 9, 2024

(54) (GLASS FILM)-RESIN COMPLEX

(71) Applicant: NITTO DENKO CORPORATION, Ibaraki (JP)

(72) Inventors: Keisuke Sato, Ibaraki (JP); Takeshi Murashige, Ibaraki (JP); Junichi Inagaki, Ibaraki (JP); Atsushi Kishi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/045,816

(22) PCT Filed: Apr. 17, 2019

(86) PCT No.: PCT/JP2019/016473
§ 371 (c)(1),
(2) Date: Oct. 7, 2020

(87) PCT Pub. No.: WO2019/208361
PCT Pub. Date: Oct. 31, 2019

(65) Prior Publication Data
US 2021/0138762 A1    May 13, 2021

(30) Foreign Application Priority Data
Apr. 25, 2018 (JP) .................. 2018-084413

(51) Int. Cl.
*B32B 7/02* (2019.01)
*B32B 7/06* (2019.01)
*B32B 17/10* (2006.01)

(52) U.S. Cl.
CPC .................. *B32B 7/02* (2013.01); *B32B 7/06* (2013.01); *B32B 17/10* (2013.01);
(Continued)

(58) Field of Classification Search
CPC ....... B32B 7/02; B32B 7/06; B32B 17/10018; B32B 17/10779; B32B 2457/202; B32B 2457/206
See application file for complete search history.

(56) References Cited

U.S. PATENT DOCUMENTS 5,342,872 A   8/1994  Huber
8,525,405 B2  9/2013  Kuwabara et al.
(Continued)

FOREIGN PATENT DOCUMENTS

JP    2011-121320 A    6/2011
JP    2012-224058 A    11/2012
(Continued)

OTHER PUBLICATIONS

Espacenet Translation of JP 2015174694 (Year: 2021).*
(Continued)

*Primary Examiner* — Michael Zhang
(74) *Attorney, Agent, or Firm* — WHDA, LLP (57) ABSTRACT

Provided is a glass film-resin composite, which prevents the breakage of a glass film and enables the production of an elongated glass film. The glass film-resin composite of the present invention includes: an elongated glass film; a resin tape, which is arranged on at least one surface of the elongated glass film and is linearly arranged at least near each of both ends in a widthwise direction of the elongated glass film in one surface of the elongated glass film; a protective layer, which is arranged near each of both the ends in the widthwise direction of the surface of the elongated glass film having arranged thereon the resin tape and on an outside of the resin tape in the widthwise direction; and a resin layer arranged on one surface of the elongated glass film.

7 Claims, 3 Drawing Sheets

(52) U.S. Cl.
CPC .. *B32B 17/10018* (2013.01); *B32B 17/10779* (2013.01); *B32B 2457/202* (2013.01); *B32B 2457/206* (2013.01)

(56) References Cited

U.S. PATENT DOCUMENTS

| | | | |
|---|---|---|---|
| 9,017,759 B2 | 4/2015 | Garner et al. | |
| 9,034,458 B2 | 5/2015 | Li | |
| 9,428,359 B2 | 8/2016 | Garner et al. | |
| 9,522,800 B2 | 12/2016 | Garner et al. | |
| 9,604,808 B2 | 3/2017 | Garner et al. | |
| 9,783,449 B2 | 10/2017 | Murashige et al. | |
| 10,183,826 B2 | 1/2019 | Garner et al. | |
| 11,241,863 B2 | 2/2022 | Murashige et al. | |
| 2010/0285277 A1* | 11/2010 | Edwards | C03C 27/048 156/331.7 |
| 2011/0023548 A1* | 2/2011 | Garner | B32B 37/142 65/106 |
| 2011/0171417 A1 | 7/2011 | Nakamura et al. | |
| 2012/0258584 A1 | 10/2012 | Garner et al. | |
| 2012/0301683 A1 | 11/2012 | Li | |
| 2013/0134202 A1 | 5/2013 | Garner et al. | |
| 2015/0176118 A1 | 6/2015 | Tamagaki et al. | |
| 2015/0183186 A1* | 7/2015 | Bigelow | B32B 37/18 156/249 |
| 2015/0197407 A1 | 7/2015 | Garner et al. | |
| 2015/0232371 A1 | 8/2015 | Murashige et al. | |
| 2016/0185545 A1 | 6/2016 | Garner et al. | |
| 2017/0057770 A1 | 3/2017 | Garner et al. | |
| 2017/0232701 A1* | 8/2017 | Keite-Telgenbüscher | B32B 17/10 428/189 |
| 2019/0270663 A1 | 9/2019 | Murashige et al. | |
| 2022/0118739 A1 | 4/2022 | Murashige et al. | |

FOREIGN PATENT DOCUMENTS

| | | |
|---|---|---|
| JP | 2013-500923 A | 1/2013 |
| JP | 2014-008698 A | 1/2014 |
| JP | 2014-31539 A | 2/2014 |
| JP | 2014-97923 A | 5/2014 |
| JP | 2014-523372 A | 9/2014 |
| JP | 2015-511204 A | 4/2015 |
| JP | 2015-174694 A | 10/2015 |
| KR | 10-2012-0046759 A | 5/2012 |
| TW | 201410577 A | 3/2014 |
| WO | 2018/079546 A1 | 5/2018 |

OTHER PUBLICATIONS

International Search Report dated Jul. 9, 2019, issued in counterpart International Application No. PCT/JP2019/016473 (2 pages).

Office Action dated Feb. 3, 2021, issued in counterpart TW Application No. 108114303, with English translation (9 pages).

Extended (Supplementary) European Search Report dated Nov. 29, 2021, issued in counterpart EP Application No. 19793457.3. (6 pages).

Office Action dated Nov. 8, 2022, issued in counterpart to JP Application No. 2020-516270, with English machine translation. (7 pages).

Office Action dated Jun. 29, 2022, issued in counterpart CN application No. 201980027941.5, with English translation. (13 pages).

Office Action dated Jun. 28, 2023, issued in counterpart KR application No. 10-2020-7030284, with English translation. (10 pages).

* cited by examiner

(GLASS FILM)-RESIN COMPLEX

TECHNICAL FIELD

The present invention relates to a glass film-resin composite.

Background Art

In recent years, the weight reductions and thinning of display and lighting elements each using a liquid crystal display element or an organic EL, and of a solar cell have been advancing from the viewpoints of conveyability, storability, and a design property, and development toward continuous production by a roll-to-roll process has also been advancing. The use of extremely thin glass (hereinafter also referred to as "glass film") has been proposed as a method of imparting flexibility to glass to be used in those elements and the like. The glass film has flexibility and can be wound in a roll shape, and hence can be processed by the roll-to-roll process. There has heretofore been a disclosure of, for example, a method including processing a polarizing plate, a transparent electrode, or the like on the glass film through use of the roll-to-roll process (e.g., Patent Literature 1).

A glass material originally involves a problem in that its handleability is poor owing to its brittleness, and the problem with handleability becomes remarkable in the glass film that is so thin as to be windable in a roll shape. In particular, the glass film involves a problem in that it is difficult to continuously produce and process the glass film without its breakage, though the glass film has an advantage in that the glass film can be processed by the roll-to-roll process.

CITATION LIST

Patent Literature

[PTL 1] U.S. Pat. No. 8,525,405 B2

SUMMARY OF INVENTION

Technical Problem

The present invention has been made to solve the conventional problems, and an object of the present invention is to provide a glass film-resin composite, which prevents the breakage of a glass film and enables the production of a laminate including an elongated glass film.

Solution to Problem

According to one embodiment of the present invention, there is provided a glass film-resin composite, including: an elongated glass film; a resin tape, which is arranged on at least one surface of the elongated glass film and is linearly arranged at least near each of both ends in a widthwise direction of the elongated glass film in one surface of the elongated glass film; a protective layer, which is arranged near each of both the ends in the widthwise direction of the surface of the elongated glass film having arranged thereon the resin tape and on an outside of the resin tape in the widthwise direction; and a resin layer arranged on one surface of the elongated glass film. In one embodiment, the resin layer is arranged on a surface of the elongated glass film opposite to the surface having arranged thereon the resin tape.

In one embodiment, the resin layer is wider than the elongated glass film.

In one embodiment, the protective layer has an extending portion extending from the elongated glass film in the widthwise direction.

In one embodiment, the extending portion has a width of more than 0 mm and 200 mm or less.

In one embodiment, a width Lt of the resin tape and a width Lg of the elongated glass film have a relationship of $10 \leq Lg/Lt \leq 200$.

In one embodiment, an interval L1 between the resin tape arranged near each of both the ends in the widthwise direction of the elongated glass film and an end portion of the glass film, and a width Lg of the elongated glass film have a relationship of $10 \leq Lg/L1 \leq 1,500$.

In one embodiment, an interval L2 between the resin tapes arranged near both the ends in the widthwise direction of the elongated glass film is 50% or more and less than 100% with respect to a width Lg of the elongated glass film.

In one embodiment, the glass film-resin composite has a roll shape.

Advantageous Effect of Invention

According to the present invention, the glass film-resin composite, which prevents the breakage of a glass film and enables the production of a laminate including an elongated glass film, can be provided.

DESCRIPTION OF EMBODIMENTS

A. Overall Configuration of Glass Film-resin Composite

Figures 1A, 1B:
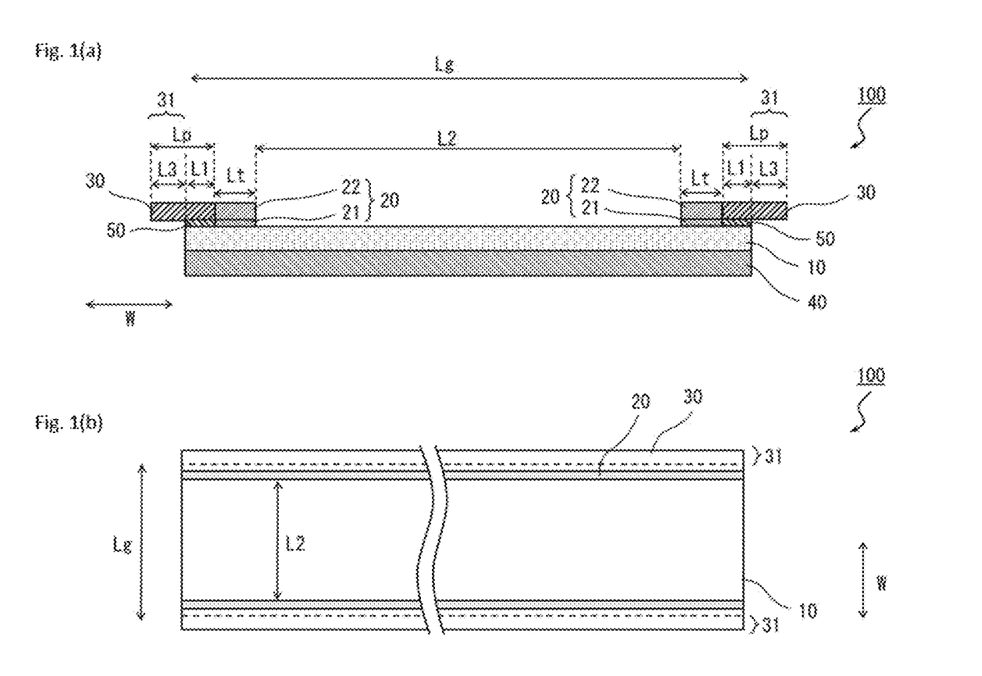
FIG. 1(a) is a schematic sectional view of a glass film-resin composite according to one embodiment of the present invention.
FIG. 1(b) is a schematic plan view of the glass film-resin composite according to the one embodiment of the present invention.

FIG. 1(a) is a schematic sectional view of a glass film-resin composite according to one embodiment of the present invention, and FIG. 1(b) is a schematic plan view of the glass film-resin composite according to the one embodiment of the present invention. A glass film-resin composite 100 includes: an elongated glass film 10; a resin tape 20 arranged on at least one surface of the elongated glass film 10; a protective layer 30 arranged near each of both ends in the widthwise direction of the surface of the elongated glass film 10 having arranged thereon the resin tape 20; and a resin layer 40 arranged on one surface of the elongated glass film 10. The resin tape 20 is linearly arranged at least near each of both the ends in the widthwise direction (a direction W in each of FIG. 1(*a*) and FIG. 1(*b*) of the elongated glass film 10 in one surface of the elongated glass film 10. The protective layer 30 is arranged near each of both the ends in the widthwise direction of the surface of the elongated glass film 10 having arranged thereon the resin tape 20 and on the outside of the resin tape 20 in the widthwise direction.

The resin tape 20 includes an adhesive layer 21, and further includes a base material 22 as required (details are described later). The adhesive layer 21 is directly arranged (fixed) on the elongated glass film 10 (i.e., arranged (fixed) without any other layer being interposed). In the present invention, the elongated glass film (sometimes simply referred to as "glass film") is protected with the resin tape including the adhesive layer. Accordingly, the resin tape suppresses the propagation of failure starting from a crack occurring in an end portion in the widthwise direction of the glass film, and hence can prevent the failure of the glass film. The glass film-resin composite of the present invention hardly causes an inconvenience such as rupture even when bent, and hence the use of the glass film-resin composite enables continuous production and processing of a glass film. In this description, the term "adhesive layer" means a layer formed of an adhesive, and the term "adhesive" refers to an adhesive that exhibits its peel-resisting force by being solidified. The "adhesive layer" is clearly distinguished from a pressure-sensitive adhesive layer including a pressure-sensitive adhesive that exhibits its peel-resisting force without being solidified. In one embodiment, the glass film-resin composite is formed so that when an attempt is made to peel the resin tape from the elongated glass film, no interfacial failure may occur at an interface between the resin tape and the elongated glass film.

As described above, the protective layer 30 is arranged near each of both the ends in the widthwise direction of the elongated glass film 10 and on the outside of the resin tape 20 in the widthwise direction. In one embodiment, the protective layer 30 is bonded to the elongated glass film 10 via any appropriate pressure-sensitive adhesive layer or adhesive layer 50. In the present invention, when the protective layer is arranged near an end portion in the widthwise direction of the glass film, cullet produced in the case where the glass film is broken at the site can be caused to stay at the broken site. Accordingly, the cullet can be prevented from adhering to the effective portion (central portion) of the glass film. The cullet that has adhered to the effective portion of the glass film serves as foreign matter an a product using the glass film to be responsible for an appearance defect. In addition, the cullet is responsible for the occurrence of a crack at the time of the winding of the glass film in a roll shape. The use of the glass film-resin composite of the present invention prevents those inconveniences to enable continuous production and processing of a glass film without the adhesion of any foreign matter.

In one embodiment, as illustrated in each of FIG. 1(*a*) and FIG. 1(*b*), the resin layer 40 is arranged on the surface of the elongated glass film 10 opposite to the surface having arranged thereon the resin tape 20 (surface on which the resin tape 20 is not arranged).

Figure 2:
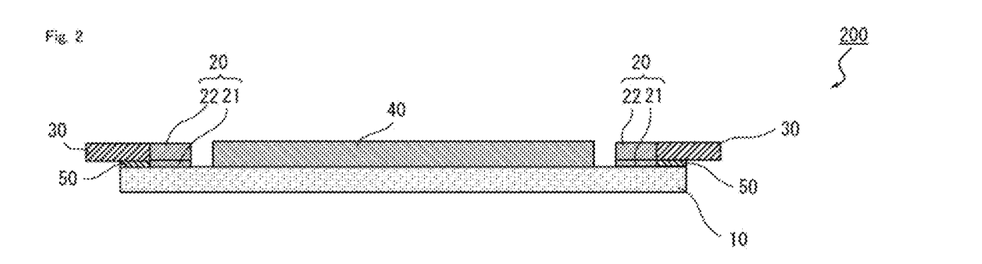
FIG. 2 is a schematic sectional view of a glass film-resin composite according to another embodiment of the present invention.

FIG. 2 is a schematic sectional view of a glass film-resin composite according to another embodiment of the present invention. In a glass film-resin composite 200 of FIG. 2, the resin layer 40 is arranged on the surface of the elongated glass film 10 having arranged thereon the resin tape 20. When the resin tape 20 and the resin layer 40 are arranged on one and the same surface, the resin layer 40 is preferably arranged on the inside of the resin tape 20 in the widthwise direction. At this time, the resin layer 40 and the resin tape 20 may be in contact with each other, or may be distant from each other.

Figure 3:
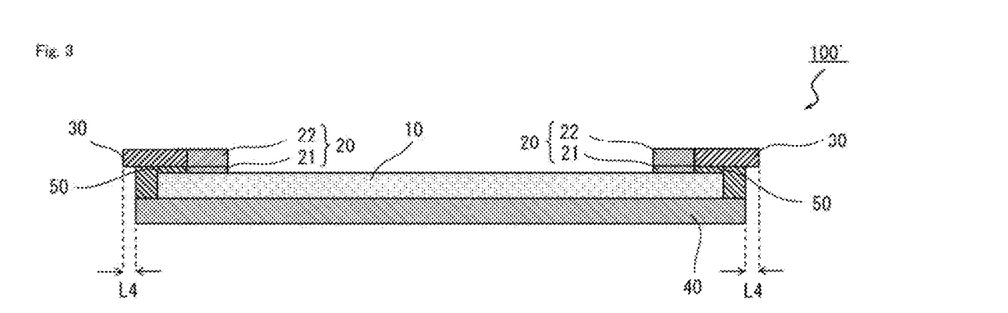
FIG. 3 is a schematic sectional view of a glass film-resin composite according to another embodiment of the present invention.

In addition, the width of the resin layer 40 and the width of the elongated glass film 10 may be identical to each other as illustrated in, for example, each of FIG. 1(*a*) and FIG. 1(*b*), or may be different from each other as illustrated in, for example, each of FIG. 2 and FIG. 3. In one embodiment, when the resin layer 40 is arranged on the surface on which the resin tape 20 is not arranged as illustrated in FIG. 3, the resin layer 40 is wider than the elongated glass film 10. For example, the width of the resin layer 40 may be more than 100% and less than 150% (preferably from 110% to 130%) with respect to the width of the elongated glass film 10.

It is preferred that as illustrated in, for example, each of FIG. 1(*a*) to FIG. 3, the protective layer 30 extend from the elongated glass film 10 in the widthwise direction, and the outer side end portion of the protective layer 30 be present on an outside in the widthwise direction with respect to the end portion of the elongated glass film 10. Details are described later.

The term "elongated" as used herein means a slender shape whose length is sufficiently long as compared to its width, and includes, for example, a slender shape having a length 10 or more times, preferably 20 or more times as long as its width. The length of the glass film-resin composite of the present invention is preferably 50 m or more, more preferably 100 m or more, still more preferably 500 m or more. According to the present invention, the breakage of a glass film can be effectively prevented, and hence a glass film having such a length that it has heretofore been impossible to continuously produce and process the glass film (e.g., 500 m or more) can be handled. The upper limit of the length of the glass film is not particularly limited, and is, for example, 1,000 m.

In one embodiment, the glass film-resin composite of the present invention is provided in a roll shape.

In one embodiment, a laminate of the glass film and the resin layer (glass film/resin layer laminate) in the glass film-resin composite of the present invention serves as a product or a semi-finished product. The glass film/resin layer laminate is used after a portion where the resin tape is arranged and the outside of the port ion have been removed. The glass film/resin layer laminate may be obtained by, for example, forming the glass film-resin composite of the present invention, subjecting the composite to a predetermined step as required, and then removing the portion where the resin tape is arranged and the outside of the portion in accordance with a method such as slitting. The region of the glass film to be finally used without being removed is hereinafter sometimes referred to as "effective region of the glass film." In other words, the glass film includes: the effective region planned to be put into practical use later, the resin having no resin tape arranged thereon; and a region planned to be removed together with the resin tape.

B. Resin Tape

B-1. Arrangement, of Resin Tape

As described above, the resin tape 20 is linearly arranged at least near each of both the ends in the widthwise direction of the elongated glass film 10 in one surface. That is, the at least two resin tapes 20 are arranged on at least one surface of the elongated glass film 10. The resin tape 20 preferably has a continuous linear shape. The length of the resin tape 20 is preferably 80% or more, more preferably 90% or more, most preferably 100% with respect to the length of the elongated glass film 10. That is, the resin tape 20 is most preferably arranged over the entire length of the elongated glass film 10.

The width Lt of each of the resin tapes 20 is preferably from 3 mm to 100 mm, more preferably from 5 mm to 60 mm, still more preferably from 10 mm to 50 mm. When the width falls within such ranges, the progress of a crack occurring in the glass film can be more effectively suppressed.

The width Lt of each of the resin tapes 20 and the width Lg of the elongated glass film preferably have a relationship of $10 \leq Lg/Lt \leq 200$, and more preferably have a relationship of $15 \leq Lg/Lt \leq 100$. When the widths have such relationships, the progress of a crack occurring in the glass film can be more effectively suppressed.

The total length of the widths Lt of the resin tapes 20 in one surface is preferably less than 50%, more preferably 40% or less, still more preferably 30% or less, particularly preferably 20% or less with respect to the width Lg of the elongated glass film. The lower limit of the total length of the widths Lt of the resin tapes 20 is preferably 5% or more, more preferably 10% or more with respect to the width Lg of the elongated glass film. The term "total length of the widths Lt of the resin tapes" means a length obtained by totalizing the widths Lt of the resin tapes arranged in plurality. In addition, when the resin tapes are arranged on both surfaces of the glass film as described later, the term "total length of the widths Lt of the resin tapes in one surface" means the total length of the widths Lt of the resin tapes in each of the surfaces.

The lower limit of the thickness of the resin tape 20 is preferably 1 μm or more, more preferably 10 μm or more, still more preferably 30 μm or more. The upper limit of the thickness of the resin tape 20 is preferably 200 μm or less, more preferably 150 μm or less, still more preferably 100 μm or less. When the resin tape includes the base material and the adhesive layer as described later, the term "thickness of the resin tape" means the total thickness of the base material and the adhesive layer, and when the resin tape includes only the adhesive layer, the term means the thickness of the adhesive layer.

The widths of the resin tapes arranged in plurality may be identical to or different from each other. The lengths of the resin tapes arranged in plurality may be identical to or different from each other. The thicknesses of the resin tapes arranged in plurality may be identical to or different from each other.

An interval L1 (shortest interval) between the resin tape arranged near each of both the ends in the widthwise direction of the elongated glass film and the end portion of the glass film is preferably 50 mm or less, more preferably 20 mm or less, still more preferably 10 mm or less, particularly preferably from 0 mm to 5 mm.

The interval L1 between the resin tape arranged near each of both the ends in the widthwise direction of the elongated glass film and the end portion of the glass film, and the width Lg of the elongated glass film preferably have a relationship of $10 \leq Lg/L1 \leq 1,500$, and more preferably have a relationship of $30 \leq Lg/L1 \leq 500$.

An interval L2 between the resin tapes arranged near both the ends in the widthwise direction of the elongated glass film is preferably 50% or more and less than 100%, more preferably from 70% to 90% with respect to the width Lg of the elongated glass film. When the interval falls within such ranges, the progress of a crack occurring in the glass film can be more effectively suppressed, and even in the case where cullet occurs, the adhesion of the cullet to the effective region can be more preferably prevented.

Figures 4A, 4B:
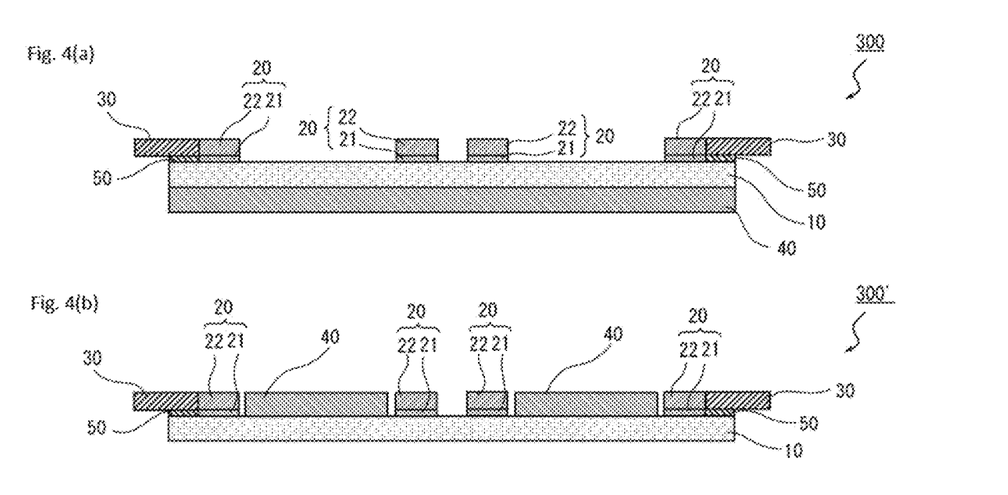
FIG. 4(a) and FIG. 4(b) are each a schematic sectional view of a glass film-resin composite according to another embodiment of the present invention.

FIG. 4(a) and FIG. 4(b) are each a schematic sectional view of a glass film-resin composite according to one embodiment of the present invention. Glass film-resin composites 300 and 300' of FIG. 4(a) and FIG. 4(b) each include the more than two (four in the illustrated example) resin tapes 20 on one surface of the elongated glass film 10. When the glass film-resin composite of such mode is divided in two in its widthwise direction, an elongated glass film/resin layer laminate including the resin tapes near both ends in its widthwise direction can be obtained. FIG. 4(a) is an illustration of a mode in which the resin layer 40 is arranged on the surface opposite to the surface having arranged thereon the resin tape 20, and FIG. 4(b) is an illustration of a mode in which the resin layer 40 is arranged on the surface having arranged thereon the resin tape 20.

The number of the resin tapes is preferably even. When the number of the resin tapes is even, a plurality of elongated glass film/resin layer laminates each including the resin tapes near both ends in its widthwise direction can be obtained. In one embodiment, the four or more resin tapes are arranged per one surface of the elongated glass film.

In one embodiment, the resin tape is arranged on a surface that is on the outside (convex side) when the glass film-resin composite is bent. The progress of a crack remarkably occurs in a surface to which a tensile stress is applied. Accordingly, when the resin tape is arranged on the surface that is on the outside (convex side) when the composite is bent, the progress of the crack can be effectively prevented. In this embodiment, the resin tape is arranged, for example, as follows: when the glass film-resin composite is wound in a roll shape, the tape is arranged on a surface that is on the outside of the roll.

Figure 5:
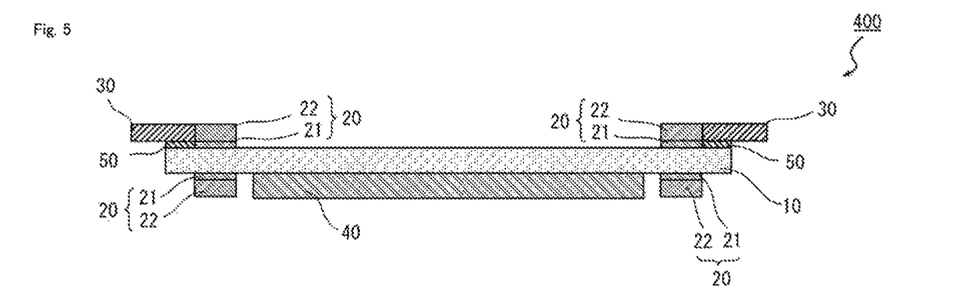
FIG. 5 is a schematic sectional view of a glass film-resin composite according to another embodiment of the present invention.

FIG. 5 is a schematic sectional view of a glass film-resin composite according to one embodiment of the present invention. A glass film-resin composite 400 of FIG. 5 includes the resin tapes 20 on both surfaces of the elongated glass film 10. In this embodiment, the two or more resin tapes 20 may be arranged on one surface (front surface), and the two or more resin tapes 20 may be arranged on the other surface (rear surface). The number of the resin tapes 20 arranged on the one surface and the number of the resin tapes 20 arranged on the other surface are preferably identical to each other.

When the resin tapes are arranged on both the surfaces of the glass film, the progress of a crack can be effectively prevented irrespective of the direction in which the glass film-resin composite is bent. The glass film-resin composite having the configuration is particularly useful when subjected to a production-processing line including a plurality of conveying rolls, and can prevent the breakage of the glass film irrespective of which one of front and rear directions the composite is bent in.

Figure 6:
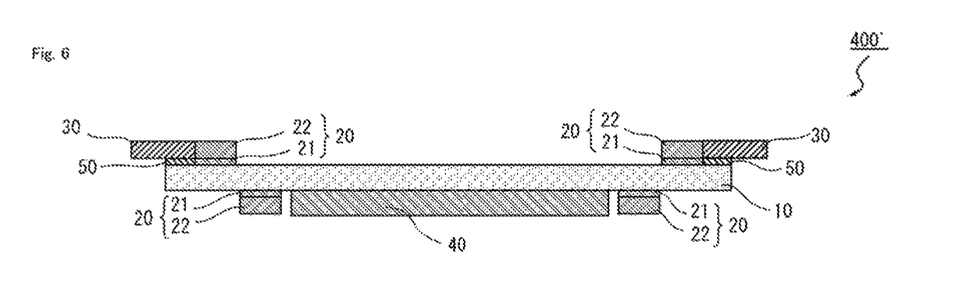
FIG. 6 is a schematic sectional view of a glass film-resin composite according to another embodiment of the present invention.

In one embodiment, as illustrated in FIG. 5, the resin tapes arranged on the front surface and the resin tapes arranged on the rear surface are opposite to each other through the glass film. In another embodiment, as illustrated in FIG. 6, the resin tapes arranged on the front surface and the resin tapes arranged on the rear surface are arranged so as not to be opposite to each other. When the resin tapes present on the front and rear surfaces are arranged so as not to be opposite to each other, that is, so as to shift from each other, an inconvenience at the time of the winding of the glass film-resin composite can be prevented.

Figure 7:
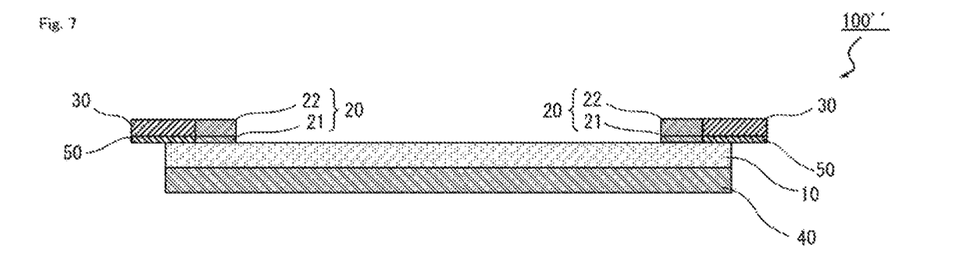
FIG. 7 is a schematic sectional view of a glass film-resin composite according to another embodiment of the present invention.

The embodiments illustrated in FIG. 1(a) to FIG. 6 above and FIG. 7 below may be appropriately combined.

B-2. Configuration of Resin Tape

In one embodiment, the resin tape includes the base material 22 and the adhesive layer 21 arranged on one surface of the base material as illustrated in each of FIG. 1(a) and FIG. 1(b). In another embodiment, the resin tape includes only the adhesive layer.

The base material may include any appropriate material. In one embodiment, the base material includes any appropriate resin material. Examples of the resin for forming the base material include polyethylene, polyvinyl chloride, polyethylene terephthalate, polyvinylidene chloride, polypropylene, polyvinyl alcohol, polyester, polycarbonate, polystyrene, polyacrylonitrile, an ethylene-vinyl acetate copolymer, an ethylene-vinyl alcohol copolymer, an ethylene-methacrylic acid copolymer, a polyamide-based resin, cellulose, and a silicone-based resin.

The base material may include a primer layer. A material that may improve adhesiveness with the adhesive layer is used as a material for forming the primer layer. Examples of the material for the primer layer include a polyester-based resin, a polycarbonate-based resin, an epoxy-based resin, an alkyd-based resin, an acrylic resin, a urea-based resin, and a urethane-based resin. In particular, when a base material formed of a polyester-based resin is used, a layer containing a resin selected from a polyester-based resin, an acrylic resin, and a urethane-based resin is preferably used as the primer layer from the viewpoint of an adhesive property. In addition, the base material may be subjected to a surface modification treatment, such as a corona treatment or a plasma treatment, for improving the adhesiveness with the adhesive layer.

The thickness of the base material is preferably from 2 μm to 200 μm, more preferably from 10 μm to 150 μm, still more preferably from 20 μm to 100 μm.

It is preferred that the width of the base material be substantially identical to the width of the adhesive layer. The phrase "widths are substantially identical to each other" means that a difference between the widths is 3 mm or less (preferably 1 mm or less).

In one embodiment, a width Lt (mm) of each of the resin tapes, a Young's modulus Eg (GPa) of the glass film, a Young's modulus Es (GPa) of the base material, a thickness Tg (μm) of the glass film, and a thickness Ts (μm) of the base material have a relationship represented by the following equation (1), and α represents a reinforcement coefficient (mm·(μm)$^{1/2}$), and represents 1.1 or more. The use of a resin tape having a width represented by the following equation (1) can provide a glass film-resin composite that can more effectively suppress the progress of a crack occurring in its glass film.

$$Lt = \alpha \frac{Eg\sqrt{Tg}}{EsTs} \qquad (1)$$

In this description, the Young's modulus Eg of the glass film is measured by a resonance method (JIS R 1602, measurement temperature: 25° C.). In addition, the Young's modulus Es of the base material may be measured with an autograph under the following conditions.

<Method of Measuring Young's Modulus of Base Material>
Measurement temperature: 25° C.
Sample size: A thickness of 50 μm, a width of 2 cm, and a length of 15 cm
Chuck-to-chuck distance: 10 cm
Tensile rate: 10 mm/min The reinforcement coefficient α (mm·(μm)$^{1/2}$) is preferably 1.3 or more, more preferably from 1.3 to 50.

The adhesive layer for forming the resin tape contains any appropriate adhesive. In one embodiment a photocurable or thermosetting adhesive may be used. Examples of the adhesive for forming the adhesive layer include an epoxy-based adhesive, a rubber-based adhesive, an acrylic adhesive, a silicone-based adhesive, a urethane-based adhesive, and a mixture thereof.

The Young's modulus of the adhesive layer for forming the resin tape is preferably 1 GPa or more, more preferably from 2 GPa to 10 GPa. The Young's modulus of the adhesive layer may be measured with an autograph under the following conditions.

<Method of measuring Young's Modulus of Adhesive Layer>
Measurement temperature: 25° C.
Sample size: A thickness of 50 μm, a width of 2 cm, and a length of 15 cm
Chuck-to-chuck distance: 10 cm
Tensile rate: 10 mm/min The thickness of the adhesive layer for forming the resin tape is preferably from 1 μm to 50 μm, more preferably from 5 μm to 30 μm.

C. Protective Layer

As described above, the protective layer 30 is arranged near each of both the ends in the widthwise direction of the surface having arranged thereon the resin tape 20 and on the outside of the resin tape 20 in the widthwise direction. The protective layer 30 is preferably arranged only on one surface of the elongated glass film 10. The length of the protective layer 30 is preferably 30% or more, more preferably 90% or more, most preferably 100% with respect to the length of the elongated glass film 10. That is, the protective layer 30 is most preferably arranged over the entire length of the elongated glass film 10.

The width Lp of each of the protective layers 30 is preferably from 3 mm to 350 mm, more preferably from 5 mm to 200 mm, still more preferably from 10 mm to 100 mm, particularly preferably from 15 mm to 60 mm. When the width falls within such ranges, even in the case where cullet occurs near any one of both the ends in the widthwise direction of the elongated glass film, the adhesion of the cullet to the effective region can be more preferably prevented.

In one embodiment, the protective layer 30 has an extending portion 31 extending toward the outside of the elongated glass film 10 in the widthwise direction. When the protective layer has such extending portion 31, the breakage of the end portion of the elongated glass film 10 can be more preferably prevented. In particular, the extending portion is particularly useful in turning the glass film-resin composite into a roll shape.

The width L3 of the extending portion 31 is preferably more than 0 mm and 200 mm or less, more preferably from 1 mm to 170 mm, still more preferably from 10 mm to 120 mm, particularly preferably from 20 mm to 100 mm. When the width falls within such ranges, the breakage of the end portion of the elongated glass film 10 can be more preferably prevented. In addition, when the width L3 of the extending portion 31 is set to 200 mm or less (more preferably 170 mm or less), the extending portion is prevented from unnecessarily hanging down at the time of the winding of the glass film-resin composite in a roll shape, and hence a trouble at the time of the winding can be prevented. The width L3 of the extending portion 31 means a distance between an end portion in the widthwise direction of the elongated glass film 10 and the outer side end portion of the protective layer extending from the end portion.

The lower limit of a ratio Lg/L3 between the width L3 of the extending portion 31 and the width Lg of the elongated glass film is preferably 1.4, more preferably 5, still more preferably 7.5, particularly preferably 10. The upper limit of the ratio Lg/L3 is preferably 1,500, more preferably 1,000, still more preferably 700, particularly preferably 500, most preferably 300. When the ratio falls within such ranges, the adhesion of the cullet to the effective region of the glass film can be prevented while the effective region of the glass film is sufficiently secured.

When the resin layer 40 is wider than the elongated glass film 10 as illustrated in FIG. 3, the extending portion 31 of the protective layer preferably extends so as to reach the outside of the resin layer 40 in the widthwise direction. With such embodiment, the breakage of the end portion of the elongated glass film 10 can be more preferably prevented. The portion of the resin layer 40 extending from the elongated glass film 10 and the extending portion 31 are preferably laminated via any appropriate pressure-sensitive adhesive layer or adhesive layer. With such embodiment, the end surface of the elongated glass film can be effectively protected. When the protective layer 30 extends from the resin layer 40 in the widthwise direction, the width L4 of the protective layer 30 extending from the resin layer 40 is preferably less than 200 mm, more preferably less than 150 mm, still more preferably less than 120 mm, particularly preferably less than 100 mm. In FIG. 3, for convenience, the protective layer is illustrated so as to extend under a state of being parallel to the glass film and the resin layer. However, the protective layer may be arranged so as to follow a step formed by the glass film and the resin layer.

The thickness of the protective layer is preferably from 1 μm to 250 μm, more preferably from 10 μm to 200 μm, still more preferably from 30 μm to 150 μm. When the thickness falls within such ranges, the adhesion of the cullet to the effective region of the glass film can be more preferably prevented.

In one embodiment, a height from the front surface of the elongated glass film 10 to the front surface of the protective layer 30 (the total thickness of the protective layer and the pressure-sensitive adhesive layer or the adhesive layer on the elongated glass film) may be equal to or less than the thickness of the resin tape. With such embodiment, a glass film-resin composite that can be satisfactorily wound can be obtained. In another embodiment, the height from the front surface of the elongated glass film 10 to the front surface of the protective layer 30 may be equal to or more than the thickness of the resin tape. In such embodiment, the adhesion of the cullet to the effective region of the glass film can be more preferably prevented.

The resin tape 20 and the protective layer 30 may be in contact with each other, or may be distant from each other. The protective layer 30 is preferably arranged so that the outer side end surface of the resin tape 20 in the widthwise direction and the inner side end surface of the protective layer 30 in the widthwise direction may be in contact with each other. When the resin tape 20 and the protective layer 30 are distant from each other, a distance between the resin tape 20 and the protective layer 30 is preferably 5 mm or less, more preferably 3 mm or less, still more preferably 1 mm or less.

The protective layer may include any appropriate material. The protective layer is preferably formed from a resin film. Examples of the material for forming the protective layer include polyethylene terephthalate, polyethylene, polyvinyl chloride, polyvinylidene chloride, polypropylene, polyvinyl alcohol, polyester, polycarbonate, polystyrene, polyacrylonitriie, an ethylene-vinyl acetate copolymer, an ethylene-vinyl alcohol copolymer, an ethylene-methacrylic acid copolymer, a polyamide-based resin, cellulose, and a silicone-based resin. Of those, polyethylene terephthalate is preferred. When the polyethylene terephtalate is used, the adhesion of the cullet to the effective region of the glass film can be more preferably prevented. In addition, in the case where the protective layer has the extending portion, the extending portion can be prevented from unnecessarily hanging down by using the polyethylene terephthalate.

The protective layer may be bonded to the elongated glass film via any appropriate pressure-sensitive adhesive layer or adhesive layer. The pressure-sensitive adhesive layer or the adhesive layer may be formed on the entirety of the rear surface of the protective layer, or may be formed on part of the rear surface. When the protective layer has the extending portion, in one embodiment, as illustrated in, for example, each of FIG. 1(a) and FIG. 1(b), the pressure-sensitive adhesive layer or the adhesive layer is formed on the elongated glass film, and is not formed in the extending portion. In another embodiment, as illustrated in FIG. 7, the pressure-sensitive adhesive layer or the adhesive layer is formed on the elongated glass film, and is also formed on the rear surface of the protective layer in the extending portion.

D. Resin Layer

The resin layer may be turned into any appropriate layer in accordance with the applications of the glass film/resin layer laminate. The resin layer may be, for example, a polarizing plate, an optical film, a conductive film, or a light control film. The polarizing plate is described below as a typical example.

The polarizing plate includes a polarizer. The thickness of the polarizer is not particularly limited, and an appropriate thickness may be adopted in accordance with purposes. The thickness is typically from about 1 μm to about 80 μm. In one embodiment, a thin polarizer is used, and the thickness of the polarizer is preferably 20 μm or less, more preferably 15 μm or less, still more preferably 10 μm or less, particularly preferably 6 μm or less.

The polarizer preferably shows absorption dichroism at any wavelength in the wavelength range of from 380 nm to 780 nm. The single layer transmittance of the polarizer is preferably 40.0% or more, more preferably 41.0% or more, still more preferably 42.0% or more, particularly preferably 43.0% or more. The polarization degree of the polarizer is preferably 99.8% or more, more preferably 99.9% or more, still more preferably 99.95% or more.

The polarizer is preferably an iodine-based polarizer. More specifically, the polarizer may include a polyvinyl alcohol-based resin (hereinafter ref erred to as "PVA-based resin") film containing iodine.

Any appropriate resin may be adopted as a PVA-based resin for forming the PVA-based resin film. Examples thereof include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in accordance with JIS K 6726-1994. The use of the PVA-based resin having such saponification degree can provide a polarizer excellent in durability. When the saponification degree is excessively high, the resin may gel.

The average polymerization degree of the PVA-based resin may be appropriately selected in accordance with purposes. The average polymerization degree is typically from 1,000 to 10,000, preferably from 1,200 to 5,000, more preferably from 1,500 to 4,500. The average polymerization degree may be determined in accordance with JIS K 6726-1994.

A method of producing the polarizer is, for example, a method (I) including stretching and dyeing the PVA-based resin film alone, or a method (II) including stretching and dyeing a laminate (i) including a resin substrate and a polyvinyl alcohol-based resin layer. Detailed description of the method (I) is omitted because the method is a method well known and commonly used in the art. The production method (II) preferably includes a step of stretching and dyeing the laminate (i) including the resin substrate and the polyvinyl alcohol-based resin layer formed on one side of the resin substrate to produce the polarizer on the resin substrate. The laminate (i) may be formed by applying an application liquid containing the polyvinyl alcohol-based resin onto the resin substrate and drying the liquid. In addition, the laminate (i) may be formed by transferring a polyvinyl alcohol-based resin film onto the resin substrate. Details about the production method (II) are described in, for example, JP 2012-73580 A, which is incorporated herein by reference.

In one embodiment, the polarizing plate includes a protective film arranged on at least one side of the polarizer. Any appropriate resin film may be adopted as the protective film. Examples of a material for forming the protective film include: polyester based resins, such as polyethylene terephthalate (PET); cellulose-based resins, such as triacetylcellulose (TAC); cycloolefin-based resins, such as a norbornene-based resin; olefin-based resins, such as polyethylene and polypropylene; and (meth)acrylic resins. Of those, polyethylene terephthalate (PET) is preferred. The term "(meth)acrylic resin" refers to an acrylic resin and/or a methacrylic resin.

In one embodiment, a (meth)acrylic resin having a glutarimide structure is used as the (meth)acrylic resin. The (meth)acrylic resin having a glutarimide structure (hereinafter also referred to glutarimide resin) is described in, for example, JP 2006-309033 A, JP 2006-317560 A, JP 2006-328329 A, JP 2006-323334 A, JP2006-337491 A, JP2006-337492 A, JP2006-337493 A, JP2006-337569 A, JP 2007-009182 A, JP 2009-161744 A, and JP 2010-284840 A, the descriptions of which are incorporated herein by reference.

The protective film and the polarizer are laminated via any appropriate adhesion layer. The resin substrate used at the time of the production of the polarizer may be peeled before the lamination of the protective film and the polarizer, or after the lamination.

The thickness of the protective film is preferably from 4 µm to 250 µm, more preferably from 5 µm to 150 µm, still more preferably from 10 µm to 100 µm, particularly preferably from 10 µm to 50 µm.

The modulus of elasticity of the protective film is preferably from 1 GPa to 10 GPa, more preferably from 2 GPa to 7 GPa, still more preferably from 2 GPa to 5 GPa. When the modulus of elasticity falls within such ranges, an optical film excellent in puncture resistance can be obtained.

E. Glass Film

Any appropriate glass film may be adopted as the glass film. According to classification based on composition, examples of the glass film include soda-lime glass, borate glass, aluminosilicate glass, and quartz glass films. In addition, according to classification based on an alkali component, examples of the glass film include alkali-free glass and low-alkali glass films. The content of an alkali metal component (e.g., $Na_2O$, $K_2O$, or $Li_2O$) in the glass is preferably 15 wt % or less, more preferably 10 wt % or less.

The thickness of the effective region of the glass film is preferably from 30 µm to 150 µm, more preferably from 50 µm to 140 µm, still more preferably from 70 µm to 130 µm, particularly preferably from 80 µm to 120 µm.

The width Lg of the glass film is not particularly limited, but is preferably from 100 mm to 5,000 mm, more preferably from 200 mm to 3,000 mm, still more preferably from 500 mm to 2,000 mm.

The glass film preferably has a light transmittance at a wavelength of 550 nm of 85% or more. The glass film preferably has a refractive index at a wavelength of 550 nm of from 1.4 to 1.65.

The glass film has a density of preferably from 2.3 g/cm$^3$ to 3.0 g/cm$^3$, more preferably from 2.3 g/cm$^3$ to 2.7 g/cm$^3$.

Any appropriate method may be adopted as a forming method for the glass film. The glass film is typically produced by melting a mixture containing a main raw material, such as silica or alumina, a fining agent, such as salt cake or antimony oxide, and a reducing agent, such as carbon, at a temperature of from 1,400° C. to 1,600° C., and forming the molten mixture into a thin sheet shape, followed by cooling. Examples of the forming method for the glass film include a slot down-draw method, a fusion method, and a float method. The glass film formed in a sheet shape by any one of those methods may be chemically polished with a solvent, such as hydrofluoric acid, as required, in order to reduce its thickness or enhance its smoothness.

F. Method of Producing Glass Film-Resin Composite

The glass film-resin composite maybe formed by any appropriate method. The glass film-resin composite may be formed by, for example, fixing the resin tape on the glass film to form a laminate A, and then laminating the resin layer on the laminate A. Examples of a method of fixing the resin tape include: (i) a method including applying the adhesive onto the glass film and curing the adhesive; and (ii) a method including applying the adhesive onto the glass film and/or the base material, laminating the glass film and the base material via the adhesive, and then curing the adhesive. According to the method (i), a laminate A including a resin tape free of any base material can be obtained. According to the method (ii), a laminate A including a resin tape including the base material and the adhesive layer can be obtained. It is preferred that the application of the adhesive and the supply of the base material, and the curing of the adhesive be continuously performed while the elongated glass film is conveyed. In one embodiment, the application of the adhesive and the supply of the base material are performed while the glass film is conveyed as it is without being wound after the glass film has been produced. At this time, the glass film to be used for fixing the resin tape maybe a glass film with ear portions. The term "glass film with ear portions" means a glass film having thick-wall portions (ear portions) produced in end portions in the widthwise direction of the glass film, the ear portions being produced when both the ends in the widthwise direction of the glass film are mechanically held at the time of its forming. The resin tape may be arranged inside each of the ear portions.

Examples of a method of applying the adhesive include: coating methods, such as air doctor coating, blade coating, knife coating, reverse coating, transfer roll coating, gravure roll coating, kiss coating, cast coating, spray coating, slot orifice coating, calender coating, electrodeposition coating, dip coating, and die coating; and printing methods including a letterpress printing method, such as flexographic printing, an intaglio printing method, such as a direct gravure printing method or an offset gravure printing method, a lithographic printing method, such as an offset printing method, and a stencil printing method, such as a screen printing method.

Any appropriate method may be adopted as a method of curing the adhesive in accordance with the kind of the adhesive. In one embodiment, the adhesive may be cured by UV irradiation or a heating treatment. A condition for the UV irradiation is, for example, as follows: an irradiation integrated light quantity is from 100 mJ/cm$^2$ to 2,000 mJ/cm$^2$, preferably from 200 mJ/cm$^2$ to 1,000 mJ/cm$^2$.

When the resin tape is fixed to the glass film with ear portions, the ear portions are preferably removed by slitting after the lamination of the resin tape. The ear portions are preferably removed after the lamination of the resin tape and before the winding of the glass film-resin composite. An approach to removing the ear portions is, for example, a method including mechanically cutting the glass film, a method including arranging a flaw (scribe) in the surface of the glass film and growing a crack (breaking the glass film) with heat or a bending stress, or a method including dividing the glass film through irradiation with laser light. A laser light source is, for example, a $CO_2$ laser or an YAG laser.

In one embodiment, the laminate A obtained after the lamination of the resin tape (and after the slitting of the ear portions as required) may be laminated together with the resin layer after having been wound in a roll shape once. In the present invention, the laminate A includes the resin tape, and hence the resin layer can be laminated while the breakage of the glass film (more specifically, the breakage of the effective region of the glass film) is prevented. In another embodiment, after the formation of the laminate A, the lamination of the resin layer may be continuously performed without the winding of the laminate. The resin layer may be formed by, for example, such a method as described below: a resin film is laminated via any appropriate pressure-sensitive adhesive layer or adhesive layer; or a composition for forming the resin layer is applied and dried. Any appropriate methods may be adopted as a method of applying the composition for forming the resin layer and a method of drying the composition.

EXAMPLES

The present invention is specifically described below by way of Examples, but the present invention is by no means limited to these Examples.

Production Example 1

(Preparation of Adhesive)

An epoxy-based resin (manufactured by Daicel Chemical Industries, Ltd., product name: "CELLOXIDE 2021P"), another epoxy-based resin (manufactured by Daicel Chemical Industries, Ltd., product name: "EHPE 3150"), an ozetane-based resin (manufactured by Toagosei Co., Ltd., product name: "ARON OXETANE OXT-221"), an epoxy group-terminated coupling agent (manufactured by Shin-Etsu Chemical Co., Ltd., product name: "KBM-403"), and a polymerization initiator (CPI-101A manufactured by San-Apro Ltd.) were mixed at a ratio of 60:10:20:4:2 to prepare a UV-curable adhesive.

[Production Example 2] Preparation of Polarizing Plate A (Preparation of Polarizer)

First, a laminate obtained by forming a 9-micrometer thick PVA layer on an amorphous PET substrate was subjected to in-air auxiliary stretching at a stretching temperature of 130° C. to produce a stretched laminate. Next, the stretched laminate was subjected to dyeing to produce a colored laminate. Further, the colored laminate was subjected to in-boric-acid-solution stretching at a stretching temperature of 65° C. so that the total stretching ratio became 5.94 times. Thus, an optical film laminate including a 4-micrometer thick PVA layer stretched together with the amorphous PET substrate was produced. Such two-stage stretching was able to produce an optical film laminate including the 4-micrometer thick PVA layer, the layer forming such a high-function polarizer that the PVA molecules of the PVA layer formed on the amorphous PET substrate were aligned in a high order, and iodine caused to adsorb to the polarizer by the dyeing was aligned as a poly iodide ion complex in one direction in a high order.

(Preparation of Acrylic Film) A methacrylic resin pellet having a glutarimide ring unit was dried at 100.5 kPa and 100° C. for 12 hours, and was extruded from the T-die of a single-screw extruder at a die temperature of 270° C. to be formed into a film shape. The film was stretched in its conveying direction (MD direction) under an atmosphere having a temperature higher than the Tg of the resin by 10° C. Next, the film was stretched in the direction (TD direction) perpendicular to the film-conveying direction under an atmosphere having a temperature higher than the Tg of the resin by 7° C. Thus, an acrylic film having a thickness of 40 μm was obtained.

(Preparation of Curable Adhesive)

35 Parts by weight of N-hydroxyethyl acrylamide HEAA (manufactured by Kohjin Co., Ltd.), 45 parts by weight of N-acryloylmorpholine ACMO (manufactured by Kohjin Co., Ltd.), 25 parts by weight of polypropylene glycol diacrylate TPGDA (manufactured by Toagosei Co., Ltd., product name: "ARONIX M-220"), 3 parts by weight of a photopolymerization initiator (manufactured by Ciba Specialty Chemicals, product name: "IRGACURE 184"), and 1.5 parts by weight of another photopolymerization initiator (manufactured by Nippon Kayaku Co., Ltd., product name: "KAYACURE DETX-S") were added as an adhesive.

(Production of Polarizing Plate)

The curable adhesive was applied in an application thickness of about 1 μm to the polarizer produced on the PET film. Next, the acrylic film having a thickness of 40 μm was bonded to the adhesive layer. The adhesive was irradiated with UV light having a peak UV irradiance of 1,600 mW/cm$^2$ and a UV integrated light quantity of 1,000 mJ/cm$^2$ (wavelength: from 380 nm to 440 nm), which had been emitted from a conveyor-type UV irradiation apparatus (manufactured by Fusion UV Systems), from the PET film side to be cured, and the cured adhesive was dried at 70° C. for 2 minutes. Finally, the PET film was peeled from the laminate obtained by laminating the acrylic film, the polarizer, and the PET film. Thus, a laminate (apolarizing plate A having a thickness of 44 μm) of the acrylic film (protective film) and the polarizer was obtained.

Example 1

A glass film with ear portions (thickness of each of the ear portions: 1 mm, thickness of an effective region: 100 μm, width: 1,500 mm) was formed by an overflow downdraw method.

A polyethylene terephthalate base material (width: 25 mm) was laminated near each of both ends in the widthwise direction of one surface of the glass film with ear portions via the adhesive prepared in Production Example 1. After that, the adhesive was irradiated with UV light. Thus, a glass film with ear portions including linear resin tapes near both ends in its widthwise direction was obtained.

Next, $CO_2$ laser light having a wavelength of 10.6 μm was applied to continuously remove the ear portions. Thus, a laminate A (width: 450 mm) was obtained.

The polarizing plate A (width: 480 mm) produced in Production Example 2 was continuously laminated on the surface of the laminate A on the side on which no resin tape was arranged via an adhesive.

Further, a protective layer (polyethylene terephthalate film, thickness: 75 μm) was continuously laminated on the outside of each of the resin tapes on the glass film in the widthwise direction via a double-sided tape. The resin tape and the protective layer were arranged so as to be in contact with each other.

Such a glass film-resin composite as illustrated in FIG. 3 was formed as described above, and the glass film-resin composite was wound.

In the glass film-resin composite, the width Lp of the protective layer was set to 20 mm, the width L3 of the extending portion (portion extending from the glass film) of the protective layer was set to 15 mm, and the width L4 of the portion of the protective layer extending from the polarizing plate A was set to 0 mm.

Examples 2 to 4

Glass film-resin composites were each obtained in the same manner as in Example 1 except that the width L3 of the extending portion (portion extending from the glass film) of the protective layer and the width L4 of the portion of the protective layer extending from the polarizing plate A were set as shown in Table 1.

Comparative Example 1

A laminate of the laminate A and the polarizing plate A was formed in the same manner as in Example 1.

A protective layer (polyethylene terephthalate film, thickness: 75 μm) was arranged only on the polarizing plate A so as to be in contact with the end surface of the glass film (no protective layer was arranged on the glass film).

The width L4' of the portion of the protective layer extending from the polarizing plate A was set to 0 mm.

Comparative Examples 2 and 3

Glass film-resin composites were each obtained in the same manner as in Comparative Example 1 except that the width L4' of the portion of the protective layer extending from the polarizing plate A was set as shown in Table 1.

<Evaluation>

The glass film-resin composites obtained in Examples and Comparative Examples were evaluated by the following methods. The results are shown in Table 1.

(1) Cullet Scattering

Whether or not glass cullet scattered was determined when a glass film-resin composite was formed by the method of any one of Examples and Comparative Examples, and was wound in a roll shape, and when the roll was conveyed after the winding.

A case in which the glass cullet did not scatter and the glass cullet did not adhere to the effective region of the glass film was judged as acceptable (indicated by Symbol "o" in the table), and a case in which the glass cullet scattered and the glass cullet adhered to the effective region of the glass film was judged as unacceptable (indicated by Symbol "x" in the table).

In addition, a crack in the glass film resulting from the glass cullet was observed, and a case in which the composite having a length of 1,000 m was able to be continuously conveyed without the crack was judged as acceptable (indicated by Symbol "o" in the table), and a case in which the crack occurred was judged as unacceptable (indicated by Symbol "x" in the table).

(2) Crumpling

When the glass film-resin composite was formed by the method of any one of Examples and Comparative Examples, the occurrence of the bending or wrinkling of the end portion of the protective layer was observed at the time of the bonding of the protective layer to the glass film/resin layer (polarizing plate A) laminate, and at the time of the winding of the glass film-resin composite.

A case in which the composite having a length of 1,000 m was able to foe continuously conveyed without the bending or wrinkling of the end portion of the protective layer was judged as acceptable (indicated by symbol "o" in the table), and a case in which the bending or wrinkling of the end portion of the protective layer occurred was judged as unacceptable (indicated by Symbol "x" in the table).

(3) Winding

When the glass film-resin composite (length: 1,000 m) was formed by the method of any one of Examples and Comparative Examples, and the glass film-resin composite was turned into a roll shape (diameter: 1 m), whether or not the end portion (the extending portion of the protective layer) hung down to cause an inconvenience (e.g., the entanglement of the extending portion) was determined.

A case in which the inconvenience did not occur was judged as acceptable (indicated by Symbol "o" in the table), and a case in which the inconvenience occurred was judged as unacceptable (indicated by Symbol "x" in the table).

(4) End Portion Protection

The glass film-resin composite was turned into a roll shape as in the (3), and the glas3 film-resin composite on the roll was mounted on a lifter so that the direction of the shaft of the roll became horizontal. Whether or not cullet scattering and a crack in the glass film occurred owing to impact caused by the collision of an end surface of the glass film-resin composite having a roll shape with a stopper at the time of the mounting on the lifter was determined by drawing the glass film-resin composite out of the roll.

A case in which none of the cullet scattering and the crack in the glass film occurred was judged as excellent (indicated by Symbol "o" in the table), a case in which the cullet scattering occurred but the crack in the glass film did not occur was judged as satisfactory (indicated by Symbol "Δ" in the table), and a case in which the cullet scattering and the crack in the glass film occurred was judged as unacceptable (indicated by Symbol "x" in the table).

TABLE 1

|  | Width Lg of glass film (mm) | Width of polarizing plate (mm) | Width Lp of protective layer (mm) | Width L3 of extending portion of layer (mm) | Width L4 of portion of protective layer extending from polarizing plate A (mm) | Cullet scattering | Crumpling | Winding | End portion protection |
|---|---|---|---|---|---|---|---|---|---|
| Example 1 | 450 | 480 | 20 | 15 | 0 | ○ | ○ | ○ | Δ |
| Example 2 | 450 | 480 | 65 | 60 | 45 | ○ | ○ | ○ | ○ |
| Example 3 | 450 | 480 | 170 | 165 | 150 | ○ | × | ○ | ○ |
| Example 4 | 450 | 480 | 320 | 315 | 300 | ○ | × | × | ○ |
| Comparative Example 1 | 450 | 480 | 20 | 15 | 0 | × | ○ | ○ | Δ |
| Comparative Example 2 | 450 | 480 | 170 | 165 | 150 | × | × | ○ | ○ |
| Comparative Example 3 | 450 | 400 | 320 | 315 | 300 | × | × | × | ○ |

As is apparent from Table 1, according to the glass film-resin composite of the present invention, the breakage of the glass film is prevented, and hence a laminate including an elongated glass film can be produced. Each of the glass film-resin composites obtained in Examples showed no cullet scattering even when the glass film-resin composite was wound in a roll shape, and was then drawn out of the roll.

Further, when the width L3 of the extending portion of the protective layer and the width L4 of the portion of the protective layer extending from the polarizing plate A were set to appropriate widths, a trouble in processing, in particular, a trouble at the time of the winding of the glass film-resin composite in a roll shape was able to be prevented.

REFERENCE SIGNS LIST 10 elongated glass film
20 resin tape
21 adhesive layer
22 base material
30 protective layer
31 extending portion
40 resin layer
100 glass film-resin composite

The invention claimed is:

1. A glass film-resin composite, comprising:
an elongated glass film;
a resin tape, which is arranged on at least one surface of the elongated glass film and is linearly arranged at least near each of both ends in a widthwise direction of the elongated glass film in one surface of the elongated glass film, wherein the resin tape comprises an adhesive layer, the adhesive layer is arranged directly on the elongated glass film and the adhesive layer has a Young's modulus of 1 GPa or more;
a protective layer, which is arranged near each of both the ends in the widthwise direction of the surface of the elongated glass film having arranged thereon the resin tape and on an outside of the resin tape in the widthwise direction;
a resin layer arranged on one surface of the elongated glass film;
the resin layer is arranged on a surface of the elongated glass film opposite to a surface having arranged thereon the resin tape;
the width of the resin layer is identical to the width of the elongated glass film or wider than the width of the elongated glass film,
the protective layer has an extending portion extending from the elongated glass film in the widthwise direction, wherein a portion of the extending portion extending from the elongated glass film does not abut any layer of the glass film-resin composite, and
the protective layer and the resin tape directly abut.

2. The glass film-resin composite according to claim 1, wherein the resin layer is wider than the elongated glass film.

3. The glass film-resin composite according to claim 1, wherein the extending portion has a width of more than 1 mm and 200 mm or less.

4. The glass film-resin composite according to claim 1, wherein a width Lt of the resin tape and a width Lg of the elongated glass film have a relationship of 10≤Lg/Lt≤200.

5. The glass film-resin composite according to claim 1, wherein an interval L1 between the resin tape arranged near each of both the ends in the widthwise direction of the elongated glass film and an end portion of the glass film, and a width Lg of the elongated glass film have a relationship of 10≤Lg/L1≤1,500.

6. The glass film-resin composite according to claim 1, wherein an interval L2 between the resin tape arranged near both the ends in the widthwise direction of the elongated glass film is 50% or more and less than 100% with respect to a width Lg of the elongated glass film.

7. The glass film-resin composite according to claim 1, wherein the glass film-resin composite has a roll shape.

* * * * *